UNITED STATES PATENT OFFICE.

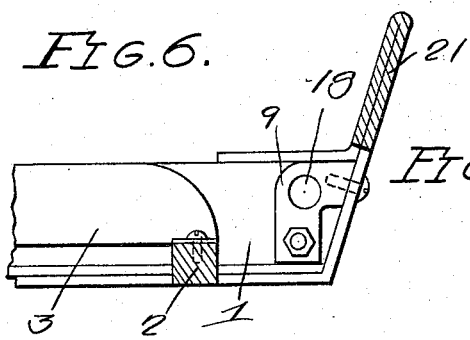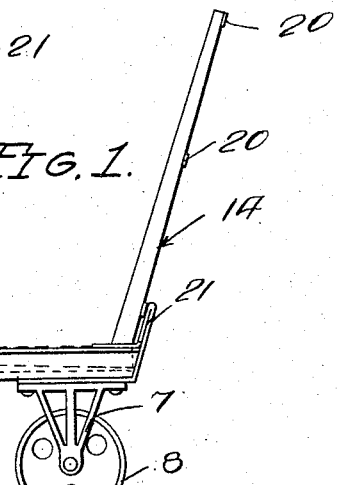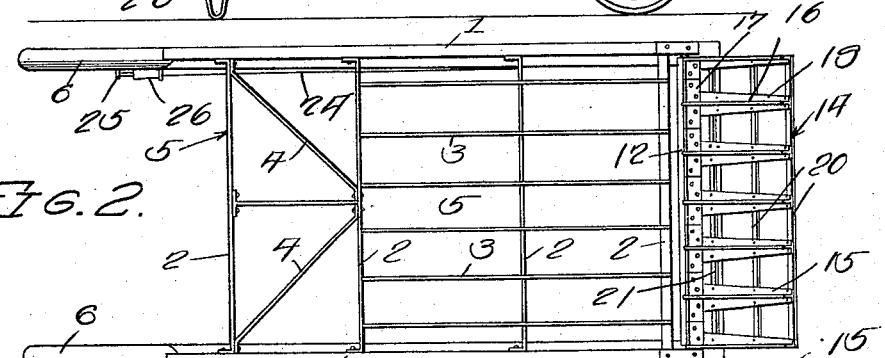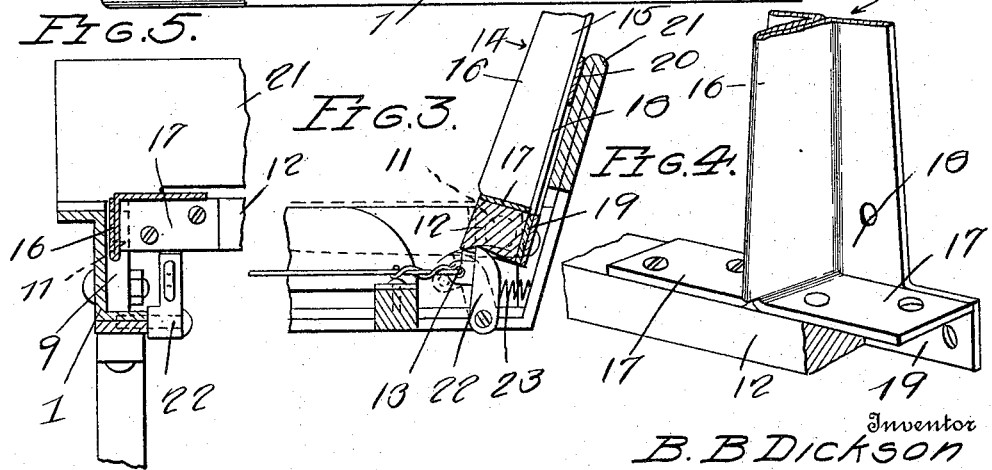

BRAXTON B. DICKSON, OF GAINESVILLE, TEXAS.

WAREHOUSE-TRUCK.

1,185,383.  Specification of Letters Patent.  Patented May 30, 1916.

Application filed January 2, 1914. Serial No. 810,055.

*To all whom it may concern:*

Be it known that I, BRAXTON B. DICKSON, a citizen of the United States, residing at Gainesville, in the county of Cooke, State of Texas, have invented certain new and useful Improvements in Warehouse-Trucks; and I do hereby declare the following to be a full, clear, and exact description of the invention, such as will enable others skilled in the art to which it appertains to make and use the same.

The present invention is directed to improvements in hand trucks, and has for its object to so construct a device of this character that the same may be adjusted in such manner that packages or boxes can be piled to a great height, thus increasing the carrying capacity of the truck.

A further object of the invention is to so construct a truck that the same may be used with the apron folded, and at which time the truck is the same in general appearance as the conventional form of truck.

With these and other objects in view, this invention resides in the novel features of construction, formation, combination and arrangement of parts to be hereinafter more fully described, claimed and illustrated in the accompanying drawing, in which:—

Figure 1 is a side elevation of the device. Fig. 2 is a top plan view. Fig. 3 is a fragmental sectional view, showing the locking means for the apron. Fig. 4 is a fragmental detail, showing the manner of securing the apron fingers to the supporting bar. Fig. 5 is a sectional view on line 5—5 of Fig. 2. Fig. 6 is a fragmentary sectional view of one of the side bars.

The truck consists of a pair of side bars 1, which are made from metal and are Z-shaped in cross section, said side bars being held in their spaced parallel relation by the transverse bars 2. Certain of the bars 2 are connected by longitudinal bars 3, and diagonally disposed brace bars 4, all of said bars when suitably connected forming a bottom 5. The rear ends of the side bars 1 terminate in curved handles 6, while the forward ends of said bars are provided with bearing members 7 which are provided with the wheels 8.

Bolted to the inner surfaces of the forward ends of the side bars 1 are angle plates 9, the same being provided with bearings 10 which receive the trunnions 11 formed upon the ends of the bar 12, said bar being rectangular in cross section and has one of its faces formed with a lug 13, the purpose of which will appear later. The apron 14 consists of a plurality of sheet metal fingers 15 which are so formed as to provide central ribs 16, the lower ends of which terminate in oppositely disposed flanges 17, which are bolted to the bar 12, said ribs terminating in opposite directed plates 18, the lower ends of which terminate in oppositely directed flanges 19, which are bolted to one of the sides of the bar 12, and coact with the flanges 17 to firmly hold the fingers connected to the bar. The fingers 15 are suitably braced by horizontally disposed brace bars 20 which are riveted or otherwise secured to the plates 18 of the fingers.

Bolted to the forward ends of the side bars 1 is a stop strip 21, which is adapted to be engaged by the apron 14 to limit the forward swinging movement thereof. To prevent the apron from folding accidentally a pawl 22 is provided, said pawl being pivotally connected to one of the side bars 1 and has its upper end disposed so as to engage the lug 13, as shown in Fig. 3, said pawl being yieldably connected to the stop strip 21 by the coil spring 23.

Connected to the pawl 22 is the forward end of the wire 24, the rear end of which is connected to a handle 25 which is slidably mounted in a casing 26, said casing being suitably connected to one of the side bars 1 of the truck.

It will be noted that when the apron 14 is folded it forms, in effect, a part of the bottom 5, and at which time the truck may be used in the conventional form. When it is desired to pile packages or boxes upon the truck it is only necessary to swing the apron 14 to the position as shown in Figs. 1 and 2, and at which time the pawl 22 engages the lug 13.

From the foregoing description it will be seen that a truck has been provided, which is formed entirely from sheet metal, the same being extremely light and at the same time is durable and strong.

What is claimed is:—

In a truck, the combination with a body portion, of an apron hinged thereon, the said apron comprising a horizontally extending bar and a plurality of spaced fingers, a stop member extending upwardly and outwardly from said body portion, a pawl pivotally mounted on the body portion beneath the aforementioned bar and to the side of the pivot remote from the stop, the said pawl being constructed and arranged to engage the under face of the said bar to prevent its pivotal movement and maintain the apron in contact with the stop and means for disengaging the said pawl from the said bar.

In testimony whereof, I affix my signature, in the presence of two witnesses.

BRAXTON B. DICKSON.

Witnesses:
W. L. GREENHILL,
J. D. HOWETH.

Copies of this patent may be obtained for five cents each, by addressing the "Commissioner of Patents, Washington, D. C."